Jan. 6, 1942.  G. H. BROWN  2,268,737
HEAT CONTROL SYSTEM AND MEANS
Filed May 13, 1940
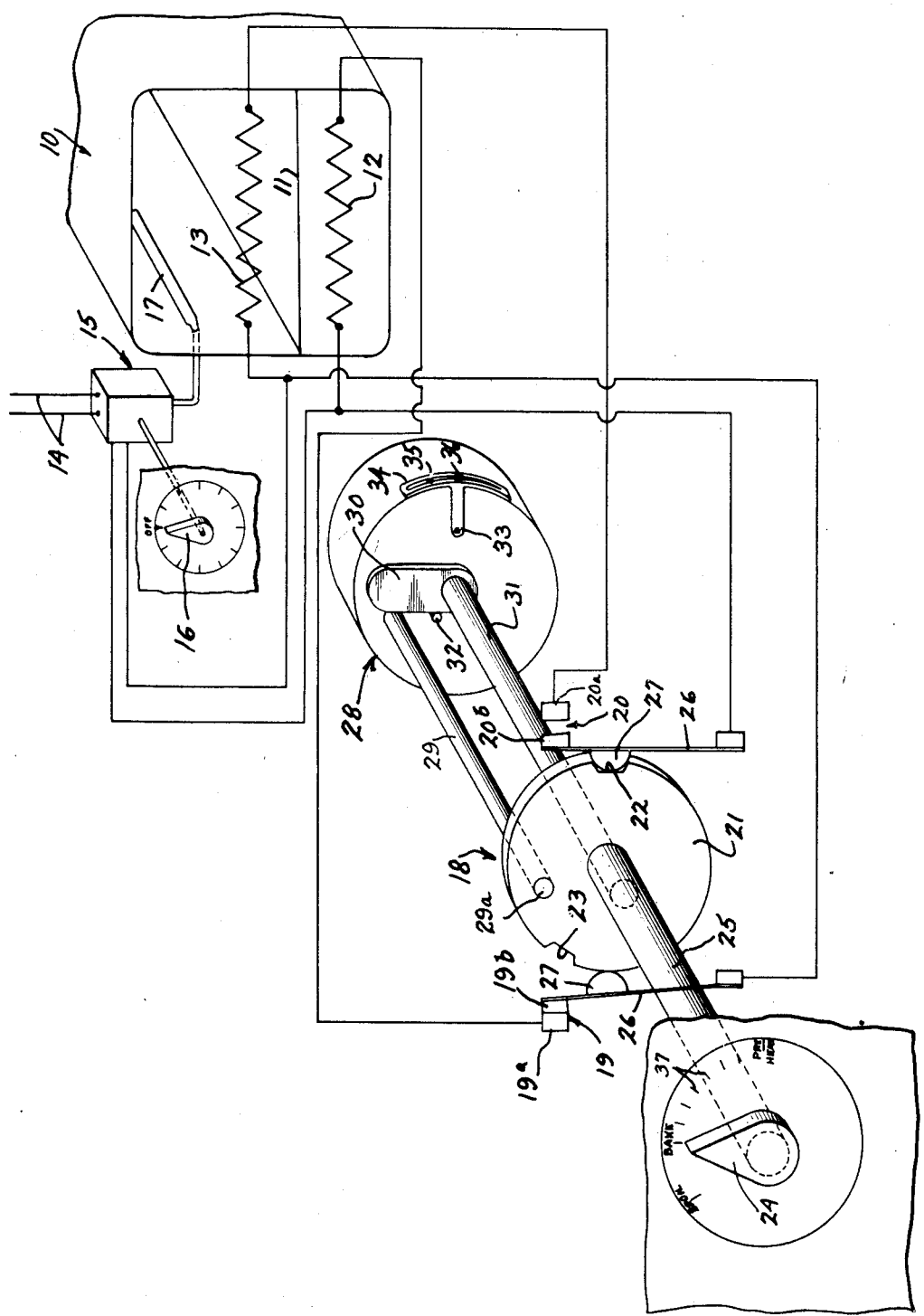
Gordon H. Brown.

Patented Jan. 6, 1942

2,268,737

UNITED STATES PATENT OFFICE 2,268,737

HEAT CONTROL SYSTEM AND MEANS

Gordon H. Brown, Detroit, Mich., assignor to Electromaster, Inc., Detroit, Mich., a corporation of Michigan Application May 13, 1940, Serial No. 334,752

1 Claim. (Cl. 200—38)

The present invention relates in general to a heat control system and means and is more particularly concerned with an arrangement which may be utilized in electric heating and cooking appliances for effecting an initial pre-heat operation thereof at a relatively high heating rate by utilizing the normally provided heating units.

A number of different arrangements have in the past been suggested and utilized for such purpose, but these arrangements have in the main been complicated, expensive and unsatisfactory in operation.

It has been common practice to provide an oven with two separate heating units, a broiling unit and a baking unit. Either of these units may be used individually, and the broiling unit may be connected with the baking unit for producing pre-heat operation. For connecting these units in the circuit, it has been the usual practice to provide a thermostat for adjusting the temperature and a separate four-position switch for varying the connections to the units. This switch provided for "off," "pre-heat," "bake" and "broil." This arrangement provided for connecting the "bake" and "broil" heating units for combined operation in the pre-heating of the oven. While this arrangement provided for the different heat operations it was objectionable in that a person might place the food in the oven at the end of a pre-heat period and neglect to turn the switch to the proper position for baking or broiling, thus resulting in the food becoming badly burned on the top.

More recently, an arrangement has been utilized which makes use of an automatic thermostate that does not require the additional switch of the previous arrangement. This thermostat, when turned to an indicated temperature, energizes both heating units until that temperature is reached. Both heating units are then de-energized and the upper or broiling unit locked in an "off" position by a release arrangement. The lower or baking unit then operates or cycles to maintain a set temperature. This automatic arrangement has proved quite satisfactory; however, the cost of the device is relatively high and the mechanism quite complicated so that it is relatively difficult to service.

Another control arrangement has also been used in which a small portion of the upper or broiling heating unit is connected in parallel with the lower or baking unit at all times, and one position of the thermostat is utilized for the pre-heating operation as well as baking, roasting, etc. This system is not as flexible and requires personal attention in order to set the thermostat each time a different heating is required.

In order to overcome the objections to the present systems for controlling the heating units, it is proposed in the present invention to provide a mechanism wherein the pre-heating time may be accelerated by connecting the "bake" heating unit and the "broil" heating unit together for the pre-heat period. Automatic timing means are provided which will operate at the end of the pre-heat time interval and automatically disconnect the "broil" heating unit so that only the "bake" heating unit remains in the circuit for continuing the baking operation. The time interval chosen would be such as to bring the temperature of the oven to the minimum temperature required for ordinary cooking operations. If higher cooking temperatures are required, the "bake" heating unit would carry the temperature up to that point after the pre-heating operation.

With the above in mind, it is a primary object of the herein described invention to provide an improved control system for two heating units, which is so arranged that either unit may be selectively energized to provide heating for different purposes such as broiling and baking, and in which the heating units may be connected for combined operation for a predetermined time interval to provide pre-heating at a relatively rapid rate, but which will automatically be re-connected at the end of the pre-heat interval so that only one of the heating units is thereafter energized.

Another object of the invention is to provide improved control for a heating system which includes a selector switch arranged to be manually actuated to provide pre-heating operation of a plurality of heating units, this operation of the switch acting to energize a timing device that will operate after a predetermined time interval to automatically operate the selector switch and re-connect the heating units for reduced heating operation.

Another object is to provide an improved control system for the heating elements of a cooking appliance such as an oven, wherein a timed pre-heat operation may be secured, and the timing mechanism will operate independently of the oven heating.

It is also an object of the invention to provide a pre-heat control system for a heating device, which is of inexpensive, simple construction, reliable in operation, easy to service and operate, and which is not apt to get out of order, even when subjected to long periods of use.

Other objects and features of the invention will more fully appear from the following detailed description, taken in connection with the accompanying drawing, in which:

The single figure diagrammatically illustrates the heating system and means for controlling the heating elements which, in this instance, are shown as being applied to a cooking oven.

As shown on the drawing:

In the illustrated embodiment of the invention, I have shown the control system and means as being applied to a cooking oven, as generally indicated by the numeral 10. This oven is of the usual construction and is provided with the usual partition 11 for separating the oven into upper and lower compartments, one of these compartments being utilized for a heating element 12 for baking purposes, and the other compartment for a heating element 13, for broiling purposes.

For setting the temperature of operation of the oven and connecting the cooking elements with a source of electrical supply 14, there is provided a temperature regulating mechanism, generally shown at 15. The temperature regulating mechanism is of the usual construction and comprises contacts which are operably connected with a manually operable handle 16 in such manner that when this handle is turned from a normal "off" position in a clockwise direction, the contacts will be closed to connect the main source of electrical supply to the heating element circuit.

In addition to the manual actuation of the contacts of the temperature regulating mechanism, this mechanism is also provided with the usual temperature responsive bulb 17 that is disposed within the oven closure, this bulb being connected with the switch contacts of the temperature regulating device in such manner that the contacts will be opened and closed in response to temperature changes within the oven. The temperature which is to be maintained in the oven is determined by the setting of the handle 16, a dial being provided with the various temperature indications thereon so that the handle may be moved to the desired indication of temperature to be maintained in the oven. The heating element may be disconnected relative to the main supply circuit by moving the handle 16 to the "off" position.

For carrying out my improved system, I have provided an additional switching device, generally indicated at 18. It will be appreciated that this switching device may assume different constructions, and I do not wish to be limited to the particular arrangement shown in the drawing merely for the purpose of illustration.

More specifically, in the illustrated construction, I have utilized two contact devices 19 and 20 composed respectively of the stationary contacts 19a—20a and the movable contacts 19b—20b. Movement of these contacts to closed and opened position is controlled by a cam 21 which is provided with recesses 22 and 23 in its active surface, which correspond to the "bake" and "broil" positions of a manually operable handle 24. This handle is connected by means of a hollow sleeve 25 to the cam 21 so that when the handle is rotated, the cam will correspondingly be rotated.

The contacts 19b and 20b are each carried at the free end of an anchored spring 26 which normally tends to hold the movable contacts out of engagement with the associated stationary contacts. Each spring 26 is provided with a projection 27 which forms a cam follower that will move the movable contacts into closed engagement with the stationary contacts whenever the follower is on the main surface of the cam, but will permit movement of the movable contacts out of engagement with the stationary contacts whenever a recessed portion of the cam is moved to a position for receiving the follower therein.

It will be apparent that in the arrangement just described movement of the handle 24 to "bake" position will bring the recess 22 to such position that the associated follower 27 of the contact 20b will have moved into the recess and enable opening of the contact 20, whereas the follower 27 associated with the movable contact 19b will be on the raised surface of the cam so that this contact will be actuated into engagement with the associated stationary contact 19a. With the contact device 19 closed, the heating element 12 is connected to the main source of supply 14 and will therefore operate to heat the oven for baking purposes. Since the contact device 20 is open, the heating element 13 is disconnected.

If the switch handle 24 is now moved to the position marked "broil," the cam 21 will be rotated counter-clockwise so as to bring the recessed portion 23 in such position as to enable movement of the follower 27 of the contact 19b thereinto. The contact device 19 is thereby opened and the heating element 12 disconnected. This movement of the cam, however, causes the follower 27 associated with the contact device 20 to move onto a raised portion of the cam so that the contact 20b will be engaged with the contact 20a and the heating element 13 connected into the circuit. This heating element is therefore energized and heats the oven for broiling purposes.

Movement of the switch handle 24 to the "preheat" position actuates the cam 21 to a position wherein the followers 27—27 of both contact devices will be on raised portions of the cam surface, so that both contact devices will have their contacts closed. This connects the heating elements 12 and 13 to the main electrical supply source through the temperature regulating device. The two heating elements under these conditions cooperate to pre-heat the oven at an increased heating rate. In order to determine the extent of the heating of the pre-heat operation and arrange for a re-connection at the end of a predetermined time interval of the heating elements, so that only one heating element remains connected, I have provided timing means, generally indicated at 28. This timing means contains a clock movement which is arranged to be wound whenever the handle 24 is moved to the "pre-heat" position.

A one-way clutching arrangement is utilized to connect the timing device with the cam 21. In this arrangement, I provide a pin 29 which is anchored at one end, as shown at 29a, to the cam 21. The other end of this pin is arranged to move over the face of the timing device and engage a winding arm 30 which is connected with the timing mechanism. The arm 30 has a shaft extension 31 which is rotatably supported in the adjacent end of the sleeve 25. Movement of the arm 30 is limited in a counter-clockwise direction by a stop pin 32, and in a clockwise direction by a stop pin 33 which may be carried on an adjustable bracket 34. This bracket is provided with a slot 35 for receiving therethrough a screw 36. In the arrangement shown, the bracket may be circumferentially moved when the screw 36 is loosened and adjusted in various angularly disposed positions about the center of rotation of the arm 30. When the screw is tightened, the bracket will be held in fixed position. Adjustment of the stop pin 33 may be utilized to vary the time interval during which the pre-heat operation may be continued. In ordinary practice, however, the timing interval will be of such length as to bring the oven to the minimum cooking temperature required for ordinary cooking operations.

With this arrangement, it will be apparent that if the handle 24 is moved to the "pre-heat" position, the pin 29 will move with the cam 21 and actuate the arm 30 in a clockwise direction until it strikes the stop pin 33. This movement energizes the timing mechanism and connects the contact devices 19 and 20 so that both heating elements 12 and 13 will be energized, provided that the temperature regulating mechanism has been previously moved from "off" position to the desired temperature at which the oven is to be regulated. The clock mechanism having been energized will start operating to move the arm 30 in a counter-clockwise direction, this movement carrying with it the cam 21 and switch handle 24. At the end of the pre-heat time interval, the arm 30 will have engaged the stop pin 32 and moved the cam 21 and handle 24 back to the "bake" position, where the contact devices 19 and 20 will be positioned to disconnect the element 13 and leave the element 12 connected for carrying on the cooking operation. Since the pin 19 is always free for movement in a counter-clockwise direction away from the arm 30, the handle 24 may at any time be actuated to the "broil" position, which will actuate the cam to operate the contacts to connect the element 13 and disconnect the heating element 12.

Although I have previously described an adjustable stop pin 33 which may be utilized to vary the timing interval, adjustment of the timing interval may also be accomplished by providing a scale 37 in connection with the handle 24. This scale comprises a series of graduations extending between the "bake" and "pre-heat" positions for indicating various positions to which the handle 24 may be set. The graduations may be provided with temperature indicating indicia and the timing mechanism calibrated in accordance with these indicated temperatures. Thus, different pre-heat temperatures may be secured, depending upon the setting of the handle 24 on the scale 37.

From the foregoing description, it will be apparent that the present invention provides an improved control system for heating appliances, particularly for ovens having two heating elements therein, which is so arranged that either element may be selectively energized to provide heating for different purposes, such as broiling and baking, which enables these elements to be connected for combined operation for a predetermined time interval to provide pre-heating at a relatively rapid rate, but which will automatically be re-connected so that only one of the heating units will subsequently be energized for the completion of the cooking operation; a control system in which the timing mechanism will operate independently of the oven heating, which is of simple and inexpensive construction, reliable in operation, easy to service and operate, and will not get out of order, even though subjected to long periods of use.

It is, of course, to be understood that although I have described in detail the preferred embodiment of my invention, the invention is not to be thus limited, but only insofar as defined by the scope and spirit of the appended claim.

I claim as my invention:

In a heat control system, a manually rotatable cam having a pair of peripherally spaced detents formed thereon, a first switch including an arm normally urged into engagement with said cam and having a projection adapted to enter a detent in said cam to open the first switch, a second switch including an arm normally urged into engagement with said cam and having a projection adapted to enter a detent in said cam to open said second switch, said cam being manually movable cooperable with said first and said second switches, respectively, to effect the closing and opening, respectively, of a selected one of said switches, and being arranged rotatable in one direction to then close both of said switches, a timing mechanism including a rotatable shaft journaled in said cam, a one-way clutch connecting said cam with said timing mechanism and comprising an arm on said shaft and a pin on said cam movable in one direction of movement to engage said arm for winding of said timing means, means to limit movement of said arm in said one direction, said cam being rotatable in said one direction to effect closing of both of said switches, said arm being engageable with said pin to drive said cam in an opposite direction of movement, and means to limit movement of said arm in the opposite direction of driven movement to result in the opening of only one of said switches by said cam.

GORDON H. BROWN.